United States Patent [19]

Stumpf et al.

[11] 4,339,180

[45] Jul. 13, 1982

[54] MOTION PICTURE CAMERA WITH FILM MARKING MEANS

[75] Inventors: Friedrich Stumpf; Thomas Scheller, both of Munich, Fed. Rep. of Germany

[73] Assignee: AGFA-Gevaert Aktiengesellschaft, Leverkusen, Fed. Rep. of Germany

[21] Appl. No.: 252,426

[22] Filed: Apr. 9, 1981

[30] Foreign Application Priority Data

Apr. 12, 1980 [DE] Fed. Rep. of Germany ....... 3014099

[51] Int. Cl.³ ............................................. G03B 21/50
[52] U.S. Cl. .................................... 352/92; 352/169; 352/174
[58] Field of Search .................. 352/22, 23, 92, 169, 352/174, 236

[56] References Cited

U.S. PATENT DOCUMENTS 3,278,251 10/1966 Freudenschuss ...................... 352/22
3,301,628  1/1967 Hellmund ............................. 352/92
3,958,872  5/1976 Roth ..................................... 352/92
4,194,817  3/1980 Staudacher .......................... 352/169

Primary Examiner—Monroe H. Hayes
Attorney, Agent, or Firm—Kontler, Grimes & Battersby

[57] ABSTRACT

A motion picture camera has a rotary shutter driven by a DC motor which is supplied from a battery. The camera also has an arrangement for making light markings for identification purposes on the film in the camera. This arrangement includes a light-emitting diode and a capacitor which is charged by the battery and discharges across the diode. The electrical circuitry is such that the capacitor is connected to the battery only when the motor is disconnected therefrom; inversely, when the motor is to be connected to the battery in order to operate the shutter (and also to advance the film), the capacitor is first disconnected from the battery before the motor is connected to it and then discharges across the diode. The circuit also suppresses afterglowing of the diode.

10 Claims, 2 Drawing Figures

MOTION PICTURE CAMERA WITH FILM MARKING MEANS

BACKGROUND OF THE INVENTION

The present invention relates to photographic apparatus in general, and more particularly to motion picture cameras. Still more particularly, the invention relates to a motion picture camera having an arrangement for marking individual motion picture scenes and/or film frames for later identification.

Cameras having such marking arrangements are already known in the art. However, the known arrangements are relatively complicated and/or do not offer an adequate degree of operational reliability.

OBJECTS AND SUMMARY OF THE INVENTION

An object of the invention is to provide an improved camera of the type mentioned above wherein the marking arrangement is simple, highly reliable and occupies little room.

Another object of the invention is to provide a camera of the above outlined character which is provided with an electrically operable marking arrangement and wherein the intensity of marking signals is largely independent of the capacity (electrical condition) of the source of DC voltage (battery) used to power the arrangement.

A further object of the invention is to treat the battery as sparingly as possible so as to prolong its useful life.

The invention is embodied in a photographic apparatus, especially in a motion picture camera, which comprises a shutter, an arrangement for driving the shutter (including a DC motor) and an energy source (battery) to energize the motor. The apparatus comprises signal generating means which is operative to produce identification markings on portions of a record carrier (such as a motion picture film) in the apparatus. The signal generating means may include a light-emitting diode (LED) having a threshold excitation value, a storage capacitor, and a resistor connected in parallel with the diode and having a resistance which is high relative to the internal resistance of the diode when the electrical discharge from the capacitor is above the threshold value but which is low relative to the internal resistance of the diode when the electrical discharge drops below the threshold value.

Actuating means (e.g., including a switch and an operator-actuated element) is provided to connect the storage capacitor with the energy source while the motor is deenergized and to disconnect the capacitor from the source and connect it directly in series with the light-emitting diode preliminary to energization of the motor.

The shutter may be a rotary shutter which is driven when the motor is energized.

With the signal generating means and actuating means as outlined above, the storage capacitor is charged by the battery while there is no drain on the battery from any other user device, such as the motor. Thus, the capacitor can be charged by the full battery capacity even if a user of the camera is taking individual pictures (stills) rather than motion picture sequences; i.e., there is sufficient time and battery strength available to do so between each two consecutive still pictures. Moreover, this result is achieved even under circumstances when the battery no longer has its full capacity (i.e., as its internal resistance increases). As mentioned above, the battery is treated sparingly because the charging of the capacitor and the energization of the light-emitting diode (hereinafter called LED for convenience) take place independently of one another in time.

The resistor which is connected in parallel with the LED prevents undesirable afterglowing of the LED because it assures that the discharge from the capacitor drops very rapidly below the threshold value of the LED. Were it not for this resistor, the capacitor could discharge only very slowly since the ohmic resistance of LED is high when the discharge drops below the threshold value. The result (without the resistor) would be afterglow of the LED and the danger that the film frame following a freshly marked frame, for example, the first frame of a moving sequence following a marked still picture, would also be marked.

If a series of successive still pictures is taken and each such picture is marked with the arrangement according to the invention, there is a possibility that the LED might be thermally overloaded (and damaged) by the electrical energy supplied to it as a result of successive discharges of the capacitor. To avoid this danger, it is now proposed to so select and conform the supply voltage of the battery and the capacitance of the capacitor to the rated values of the LED that the problem is reliably avoided. It has been found to be advantageous if the supply voltage of the battery is in the range of 2–4 volts (for example, 3 volts), the capacitance of the storage capacitor in the range of 50–150 mfd (microfarad)—for example 100 mfd—and the resistance of the resistor which is connected in parallel with the LED is in the range of 10–30 ohms—for example 22 ohms.

When the marking arrangement is installed in the photographic apparatus, it is advantageous to so locate the LED that it is offset from the center of the film window, as considered, counter to the direction of film advance, by a distance corresponding to three times the width of the film window (which, in turn, corresponds essentially to the film frame width). The purpose of such offset is to ensure that later, e.g., in a film projector, there will be no interference of stray projection light with the scanning of the markings applied to the film by the LED.

It is also advantageous if the operator-actuated element, which actuates the switch of the actuating means, is at the same time the element which triggers the making and breaking of the motor circuit. Such embodiment exhibits the advantage that, when the element is actuated, the battery is subject only to a drain from the motor but not from the capacitor since the capacitor is connected with the battery only after the motor is again disconnected therefrom.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
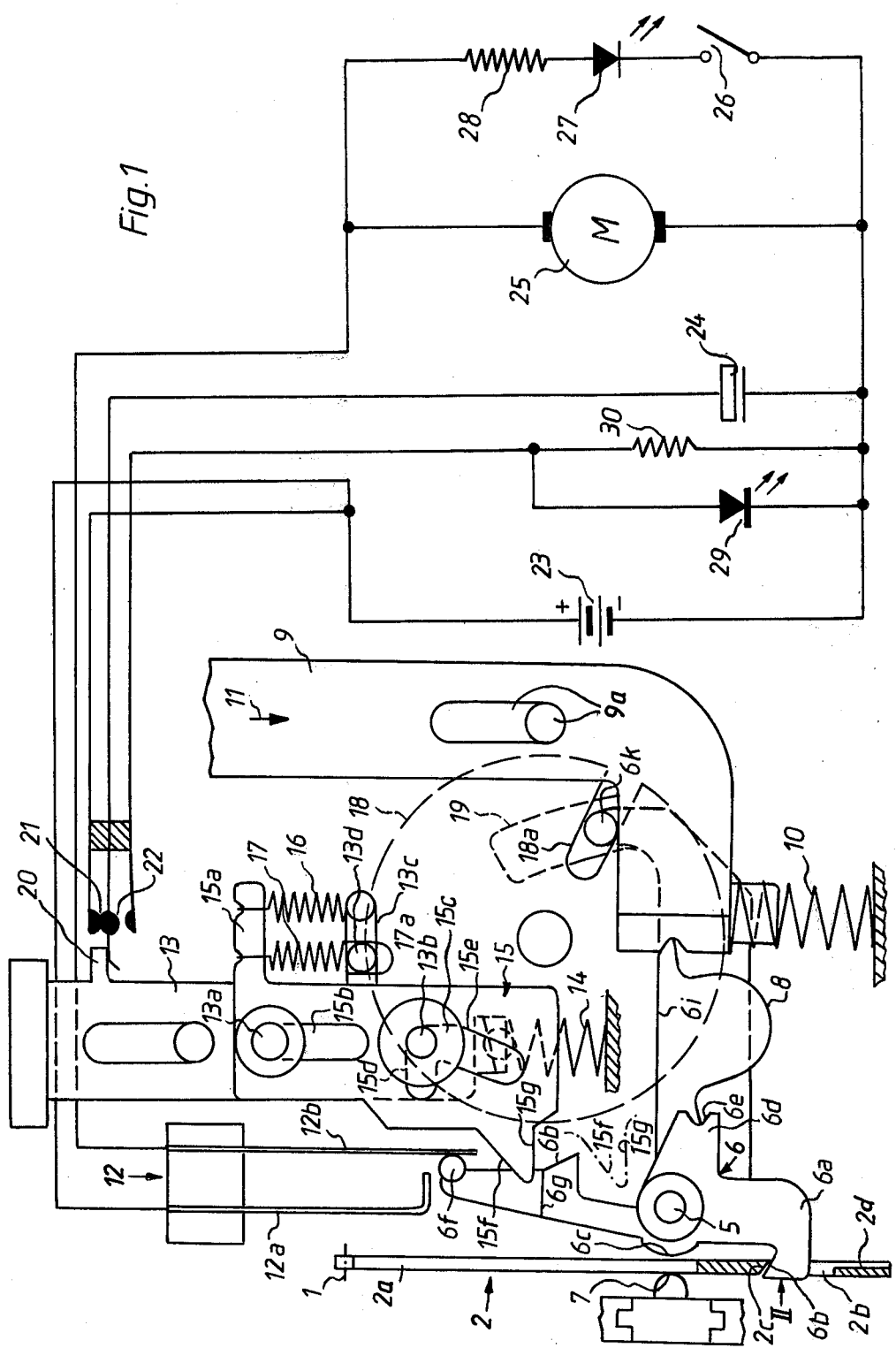
FIG. 1 is a somewhat diagrammatic illustration of an embodiment of the invention.

FIG. 1 shows schematically a rotary shutter 2 (known per se) which turns about the axis 1 in a housing (not shown) of an amateur motion picture camera (i.e., 8 mm or Super-8). The shutter 2 has an exposure aperture 2a and is formed, adjacent to an edge of the aperture 2a, with an arresting opening 2b bounded in part by a contact surface 2c. The surface 2d of the shutter 2 faces the shutter release mechanism (i.e., in a direction to the right, as viewed in FIG. 1) and is provided with a recess or depression (not shown) which, as considered in the direction of rotation of the shutter 2, is located ahead of and merges into the opening 2b.

A shutter release and blocking lever 6 is pivotable on a shaft 5 whose axis is parallel to the plane of rotation of the shutter 2. The lever 6 has a plurality of arms one of which, denoted by the reference numeral 6a, extends in a direction toward the shutter 2 and is provided with an inclined abutment surface 6b. When the shutter 2 is released and approaches the end of its revolution about the axis 1, the arm 6a enters the depression formed in the shutter 2 so as to produce a braking action; when it reaches the opening 2b, the arm 6a enters such opening (as shown) and the surfaces 6b and 2c move into abutment with each other so that the shutter is stopped in an accurately defined position in which it covers the film window of the camera. The reason for inclining the surfaces 2c and 6b in the illustrated identical manner relative to the direction of rotation of the shutter 2 is that this prevents the arm 6a from being flung back out of the opening 2b when the surface 2c and 6b strike against one another.

A bead or lobe 6c on the lever 6 projects toward the adjacent side of the shutter 2. At the other side of the shutter, there is located a further bead 7. These two beads together form a guide (gap) through which the shutter 2 moves as it rotates.

A further arm 6d of the lever 6 extends at an angle of about 90° relative to the arm 6a and is formed with a notch 6e for one end of a substantially U-shaped spring 8. The other end of the spring 8 is secured to a slide 9 serving to trigger the transport of film for the purpose of making motion picture sequences. The slide 9 is mounted, by means of a slot and pin connection 9a, for movement in the direction of arrow 11, a movement which is resisted by a restoring spring 10. When the slide 9 is moved in the direction indicated by the arrow 11, i.e., in parallelism with the plane of rotation of the shutter 2, the spring 8 causes the lever 6 to turn about the shaft 5 in a counterclockwise direction. The arm 6a is thus withdrawn from opening 2b so that the shutter 2 is free to rotate about the axis 1. At the same time, another arm 6f of the lever 6 which, up to such time, has held the spring contact 12b of a switch 12 for energizing the camera motor 25 out of engagement with the associated contact 12a of the same switch, releases the contact 12b so that the contact 12b can move into engagement with the contact 12a and complete the circuit of the motor 25. The latter now drives the shutter 2 and the (not illustrated) film transporting mechanism in a manner which is known per se and requires no detailed description or illustration. This continues until the slide 9 is released, whereupon the spring 10 returns the slide 9 to the illustrated position. During such return movement, the spring 8 pivots the lever 6 in a clockwise direction, i.e., back to the illustrated starting position, so that the arm 6a can first enter the depression of shutter 2 to brake the same, and can then snap into the opening 2b and stop further rotation of the shutter. At the same time, the arm 6f moves the contact 12b away from the contact 12a and opens the circuit of the camera motor 25.

If a user wishes to use the camera to make still (i.e., single-frame) pictures, he must operate a different element, namely a slide 13 which is reciprocable in parallelism with the slide 9 via two slot-and-pin connections 13a, 13b. Movement of the slide 13 in the direction of the arrow 11 is resisted by a restoring spring 14. A lever 15 is turnably and slidably coupled with the slide 13 via springs 16 and 17 each of which has one of its ends connected to a lug 13c of the slide 13 and the other end to a lug 15a of the lever 15. Of these springs, the spring 16 is a restoring spring for the lever 15 and performs no other function. The spring 17, however, constitutes a drive means for effecting the release movement and is provided with an elongated eye 17a with which it embraces a pin 13d provided on the lug 13c. The lever 15 has a straight slot 15b into which the pin 13a extends; it also has a slot 15c for the pin 13b. The slot 15c has a first portion 15d which extends at right angles to the direction of movement of the components 13, 15 (i.e., at right angles to the direction indicated by arrow 11) and a second portion 15e which extends forwardly from the portion 15d and is also inclined in a direction toward the plane of rotation of the shutter 2.

The lever 15 further comprises a projection or nose 15f which is formed with a surface 15g extending at right angles to the direction of movement of the slide 13 (i.e., at right angles to the direction indicated by arrow 11). When the lever 6 is in the (illustrated) shutter-blocking position, a surface 6g of the lever 6 is parallel to the surface 15g. The surface 6g is followed by and merges into an inclined surface 6h whose function will be explained below. An arm 6i of the lever 6 has a pin or projection 6k which extends into a slot 18a of a disc 18. The movements of the lever 6 and disc 18 are limited by a slot 19 formed in the camera housing or in another stationary component of the camera and into which the pin 6k also extends.

A projection 20 of the slide 13 serves to operate a transfer switch 21, 22. One contact 21 of this switch connects a source DC voltage (a battery) 23 with a storage capacitor 24 having in this embodiment a capacitance of 100 mfd. An LED 27 and a series resistor 28 can be connected in parallel with the DC motor 25 by means of a switch 26. The contact 22 serves to connect the capacitor 24 in parallel with another LED 29 which is the signal generator of the marking arrangement and is connected in parallel with a resistor 30 having, in this embodiment, a resistance of 22 ohms. The battery 23 has a nominal supply voltage of 3 volts.

To make a still exposure, the slide 13 is moved by the user in the direction of arrow 11. This results first in the contact 21 being moved by the projection 20 to a position in which the switch 21, 22 opens the charging circuit for the capacitor 24. Next, the contact 21 engages the contact 22 and the capacitor 24 is thereby directly connected with and discharges via the LED 29. During such discharge, the LED 29 produces a light flash which is recorded on the film 33 (FIG. 2) as a marking dot. The charge of the capacitor 24 drops quickly below the threshold value of the LED 29 because, once the threshold value is reached, further discharge of the capacitor 24 is no longer via LED 29 but rather across the resistor 30. This assures rapid drop of the discharge below the LED threshold and avoids any danger of afterglow of the LED 29 without, however, resulting in appreciable reduction of the intensity of light yielded by the LED or of the energy discharged by the capacitor.

As the slide 13 continues to move in the direction of the arrow 11, the surface 15g contacts the surface 6g and the springs 16, 17 store energy. The pin 13b moves away from the portion 15d of the slot 15c and enters the inclined portion 15e. After it has moved along the portion 15e by a certain (predetermined) extent, the nose 15f moves off the surface 6g. Consequently, the tensioned spring 17 abruptly dissipates energy and causes a displacement of the lever 15 in the direction of the arrow 11 and simultaneous rotation of this lever in a clockwise direction. During such composite movement, the lever 15 strikes against the surface 6h and propels the lever 6 in a counterclockwise direction about the axis defined by the shaft 5. This causes the contacts 12a, 12b to engage one another in the manner described earlier and to complete the circuit for the motor 25 which, since the lever 6 has also freed the shutter 2 for rotation, can now rotate the shutter 2 for one exposure. The presence of the disc 18 slightly delays the movement of the lever 6 in the counterclockwise direction, just sufficiently to ensure that the arm 6a, with its surface 6b, cannot move back into contact with the shutter 2 until the opening 2b has moved far enough out of position so that the arm 6a cannot reenter it until the shutter 2 has completed a revolution.

After the above movements have been completed the pin 13b returns into the upper part of the slot 15c. The nose is disengaged from the surface 6h and assumes the position shown by broken lines, i.e., a position in which the arm 6a of the lever 6 reengages the shutter 2 under the bias of the spring 8 so that it can enter first into the depression in the shutter surface 2d and then, during further rotation of the shutter, snap into the opening 2b so as to arrest the shutter. This is the time for the user to release the slide 13 which is then returned to the starting position of FIG. 1 by the restoring spring 14. The lever 15 follows such return movement under the influence of the restoring spring 16 and shifts around the surface 6h under the deflecting action exerted by the inclined upper surface of the nose 15f. During such return movement, the spring 17 is not tensioned because it has the elongated eye 17a which makes such tensioning impossible at this time. The contact 21 returns to the position in which it connects the battery 23 in circuit with the capacitor 24, and the contact 12b is disengaged from the contact 12a by the arm 6f of the lever 6.

Figure 2:
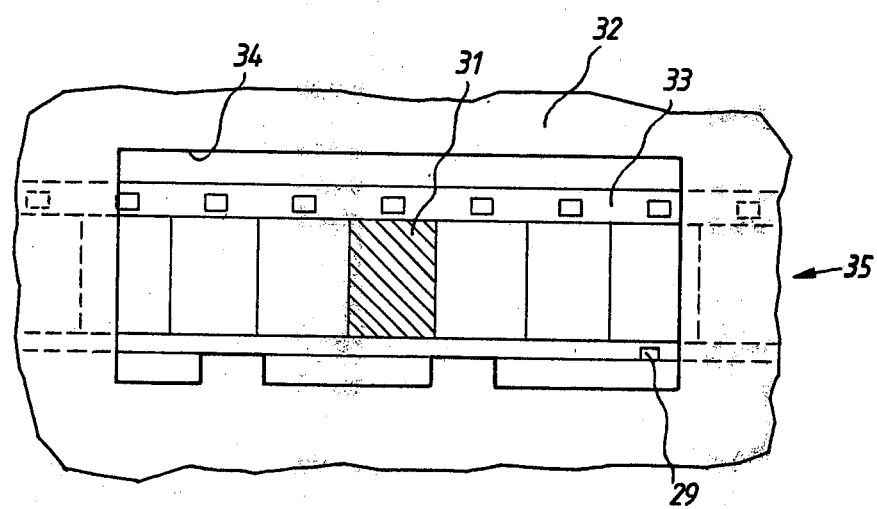
FIG. 2 is a fragmentary front elevational view, showing the region of a photographic apparatus including the film window and a film cassette installed in the apparatus.

The embodiment of FIG. 2 may or may not be used in conjunction with FIG. 1. As explained above, it is advantageous in the sense that, during later scanning of the film for markings in a projector, there will be no interference with the scan by stray projection light. Reference numeral 31 denotes the camera film window and the reference numeral 32 designates a portion of the partially illustrated film cassette which is installed in the camera and contains the film 33 to be exposed through the cassette film opening 34. The LED 29 of the arrangement of FIG. 1 is so positioned that it is laterally offset with reference to the center of the camera film window 31 by a distance equal to the width of three film frames, in a direction opposite to the direction of film advance which is designated by the arrow 35. In other words, the diode is offset counter to the direction 35 from the center of the film window 31 by the maximum distance permitted by the cassette film opening 34.

One of the important advantages of the improved apparatus is that the battery in the camera is never called upon to supply more than one user of electrical energy at any given time. Thus, and since the battery is never subjected to excessive energy drain, each user always receives the maximum available energy output and the battery life is increased.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. In a photographic apparatus of the type having a shutter, an arrangement for driving the shutter including a motor, and a source of energy for the motor, the combination of signal generating means operative to produce identification markings on portions of a film in the camera, including a light-emitting diode having a predetermined threshold excitation value, a storage capacitor, and a resistor connected in parallel with said diode and having a resistance which is high relative to the resistance of said diode when an electrical discharge from said capacitor has a value above said threshold value but is low relative to the resistance of said diode when said electrical discharge has a value below said threshold value; and actuating means for connecting said storage capacitor with the source while the motor is deenergized and operative to disconnect said storage capacitor from the source and to connect the storage capacitor directly in serie with said light-emitting diode preliminary to completion of the circuit of the motor.

2. The combination of claim 1, wherein said shutter is a rotary shutter.

3. The combination of claim 1, wherein said source is a battery.

4. The combination of claim 1, wherein said actuating means includes a switch in circuit with said storage capacitor and said light-emitting diode, and an operator-actuated element for operating said switch.

5. The combination of claim 4, wherein the arrangement for driving the shutter includes a motor supply circuit having a make-and-break switch; said operator-actuated element being arranged to operate said make-and-break switch.

6. The combination of claim 1, further comprising a film window of predetermined width which substantially equals a film frame width and past which the film is transported in a given direction, said light-emitting diode being offset from the center of said film window counter to said direction by a distance corresponding substantially to three times said predetermined width.

7. The combination of claim 1, wherein the supply voltage supplied by the source and the capacitance of said capacitor are selected relative to the rated values of said light-emitting diode to avoid thermal overloading of the diode even in the event of a series of immediately following successive discharges of the capacitor across the diode.

8. The combination of claim 7, wherein the supply voltage of the battery is in the range of 2–4 volts, the capacitance of said capacitor is in the range of 50–150 mfd, and the resistance of said resistor is in the range of 10–30 ohms.

9. The combination of claim 7, wherein the supply voltage of the battery is 3 volts, the capacitance of said capacitor is 100 mfd, and the resistance of said resistor is 22 ohms.

10. The combination of claim 1, wherein the photographic apparatus is a motion picture camera.

* * * * *